(12) United States Patent
Okubo et al.

(10) Patent No.: US 7,446,651 B2
(45) Date of Patent: Nov. 4, 2008

(54) TIRE CONDITION MONITORING SYSTEM

(75) Inventors: Youichi Okubo, Ogaki (JP); Shinichi Kawase, Ogaki (JP); Yasuhisa Tsujita, Ogaki (JP)

(73) Assignee: Pacific Industrial Co., Ltd., Ogaki (JP)

( * ) Notice: Subject to any disclaimer, the term of this patent is extended or adjusted under 35 U.S.C. 154(b) by 206 days.

(21) Appl. No.: 11/385,678

(22) Filed: Mar. 22, 2006

(65) Prior Publication Data

US 2007/0120658 A1 May 31, 2007

(30) Foreign Application Priority Data

Nov. 30, 2005 (JP) ............................. 2005-345102

(51) Int. Cl.
*B60C 23/00* (2006.01)
(52) U.S. Cl. ....................................... 340/445; 340/447
(58) Field of Classification Search ................. 340/442, 340/445–448; 73/146.2–146.5, 146.8
See application file for complete search history.

(56) References Cited

U.S. PATENT DOCUMENTS

2005/0258950 A1* 11/2005 Sahashi et al. ............... 340/444
2007/0124028 A1* 5/2007 Okubo et al. .................... 701/1

FOREIGN PATENT DOCUMENTS

| JP | A-07-170215 | 7/1995 |
|---|---|---|
| JP | A-10-228524 | 8/1998 |
| JP | A-10-229357 | 8/1998 |
| JP | A-11-139117 | 5/1999 |
| JP | A-11-254925 | 9/1999 |
| JP | A-11-321255 | 11/1999 |
| JP | A-2001-77735 | 3/2001 |
| JP | A-2005-132169 | 5/2005 |
| JP | A 2005-204133 | 7/2005 |
| JP | A-2005-212514 | 8/2005 |
| WO | WO 03/103195 | 12/2003 |
| WO | WO 2004/036784 | 4/2004 |
| WO | WO 2007/010970 | 1/2007 |

* cited by examiner

*Primary Examiner*—Thomas J Mullen
(74) *Attorney, Agent, or Firm*—Oliff & Berridge, PLC (57) ABSTRACT

A tire condition monitoring system monitoring a condition of a tire attached to a tire wheel, includes a tire side communication device mounted on the tire wheel for detecting an inner pressure of the tire and transmitting a result of detection by electromagnetic waves, a vehicle-body side communication device provided on a vehicle body including a plurality of components for receiving by electromagnetic waves information transmitted by the tire side communication device, a tire side modulator provided in the tire side communication device for superimposing information including the result of detection on electromagnetic waves, thereby outputting the electromagnetic waves as surface waves of the tire wheel, and a vehicle body side demodulator provided in the vehicle-body side communication device for receiving the electromagnetic waves propagated from the tire wheel to surfaces of the components of the vehicle body.

24 Claims, 6 Drawing Sheets

TIRE CONDITION MONITORING SYSTEM

BACKGROUND OF THE INVENTION

1. Field of the Invention

This invention relates to a tire condition monitoring system monitoring a condition of a tire.

2. Description of the Related Art

Conventional tire condition monitoring systems comprise a tire side communication device attached to a tire wheel for detecting pressure in a tire. A result of the detection is transmitted by radio waves to a vehicle-body side communication device provided on a vehicle body. For example, JP-A-2005-212514 discloses one of such conventional tire condition monitoring systems.

However, power consumption upon output of the radio waves is high in the above-described conventional tire condition monitoring systems. As a result, an internal battery of the tire side communication device is rendered large-sized or a replacement interval is short.

SUMMARY OF THE INVENTION

Therefore, an object of the present invention is to provide a tire condition monitoring system in which power consumption upon output of information by the tire side communication device can be reduced as compared with the conventional tire condition monitoring systems.

The present invention provides a tire condition monitoring system monitoring a condition of a tire attached to a tire wheel, comprising a tire side communication device mounted on the tire wheel for detecting pressure in the tire and transmitting a result of detection by electromagnetic waves, a vehicle-body side communication device provided on a vehicle body including a plurality of components for receiving by electromagnetic waves information transmitted by the tire side communication device, a tire side modulator provided in the tire side communication device for superimposing information including the result of detection on electromagnetic waves, thereby outputting the electromagnetic waves as surface waves of the tire wheel, and a vehicle-body side demodulator provided in the vehicle-body side communication device for receiving the electromagnetic waves propagated from the tire wheel to surfaces of the components of the vehicle body.

According to the tire condition monitoring system of the present invention, the tire side communication device superimposes the information on the electromagnetic waves, outputting the electromagnetic waves as the surface waves of the tire wheel and the vehicle body. Accordingly, power consumption in output of information by the tire side communication device can be reduced as compared with the conventional tire condition monitoring systems. Consequently, an internal battery of the tire side communication device can be downsized and the battery life can be longer. Furthermore, the vehicle-body side communication device is prevented from erroneously receiving information transmitted by a tire side communication device provided on another vehicle. Consequently, the reliability of communication can be improved.

Furthermore, the vehicle-body side communication device superimposes, on electromagnetic waves, information to be transmitted to the tire side communication device, outputting the electromagnetic waves as surface waves of the vehicle body. The surface waves propagate along surfaces of the components of the vehicle body and tire wheel thereby to be received by the tire side communication device. Thus, bidirectional communication can be carried out between the vehicle-body side and tire side communication devices. Additionally, since the electromagnetic waves are transmitted as the surface waves of the tire wheel and vehicle body, electric power consumption can be saved when the vehicle-body side communication device transmits information.

In another embodiment, the tire condition monitoring system further comprises a tire valve provided integrally on the tire side communication device so as to be capable of charging a gas into the tire, and a valve stem provided on the tire valve, formed into a cylindrical shape, communicating with an interior and exterior of the tire, having a valve core therein, and propagating the electromagnetic waves output by the tire side communication device to the tire wheel.

The tire side modulator delivers electromagnetic waves to the tire wheel via the valve stem fixed to the tire wheel. This delivering manner can reduce the production cost as compared with the case where dedicated components are provided for transmitting electromagnetic waves to the tire wheel.

In further another embodiment, the vehicle is provided with a plurality of the tire wheels, a plurality of the tire side communication devices are attached to the tire wheels respectively, and the tire side communication devices superimpose the respective pieces of information on the electromagnetic waves and output the electromagnetic waves asynchronously among the tire side communication devices.

Consequently, a plurality of electromagnetic waves from different transmission sources do not interfere with one another, and respective pieces of information can be accurately transmitted to the vehicle-body side communication device. Additionally, the vehicle-body side communication device can discriminatingly receive pieces of information from different transmission sources.

In further another embodiment, the vehicle is provided with a plurality of the tire wheels, a plurality of the tire side communication devices are attached to the tire wheels respectively, and the information superimposed on the electromagnetic waves by the tire side modulator includes an identifier to identify the tires.

The vehicle-body side communication device can discriminate the pieces of information delivered from the respective tire side communication devices, based on the identifier contained in the information.

BRIEF DESCRIPTION OF THE DRAWINGS

Other objects, features and advantages of the present invention will become clear upon reviewing of the following description of the embodiment, with reference to the accompanying drawings, in which.

DETAILED DESCRIPTION OF THE INVENTION

Figure 1:
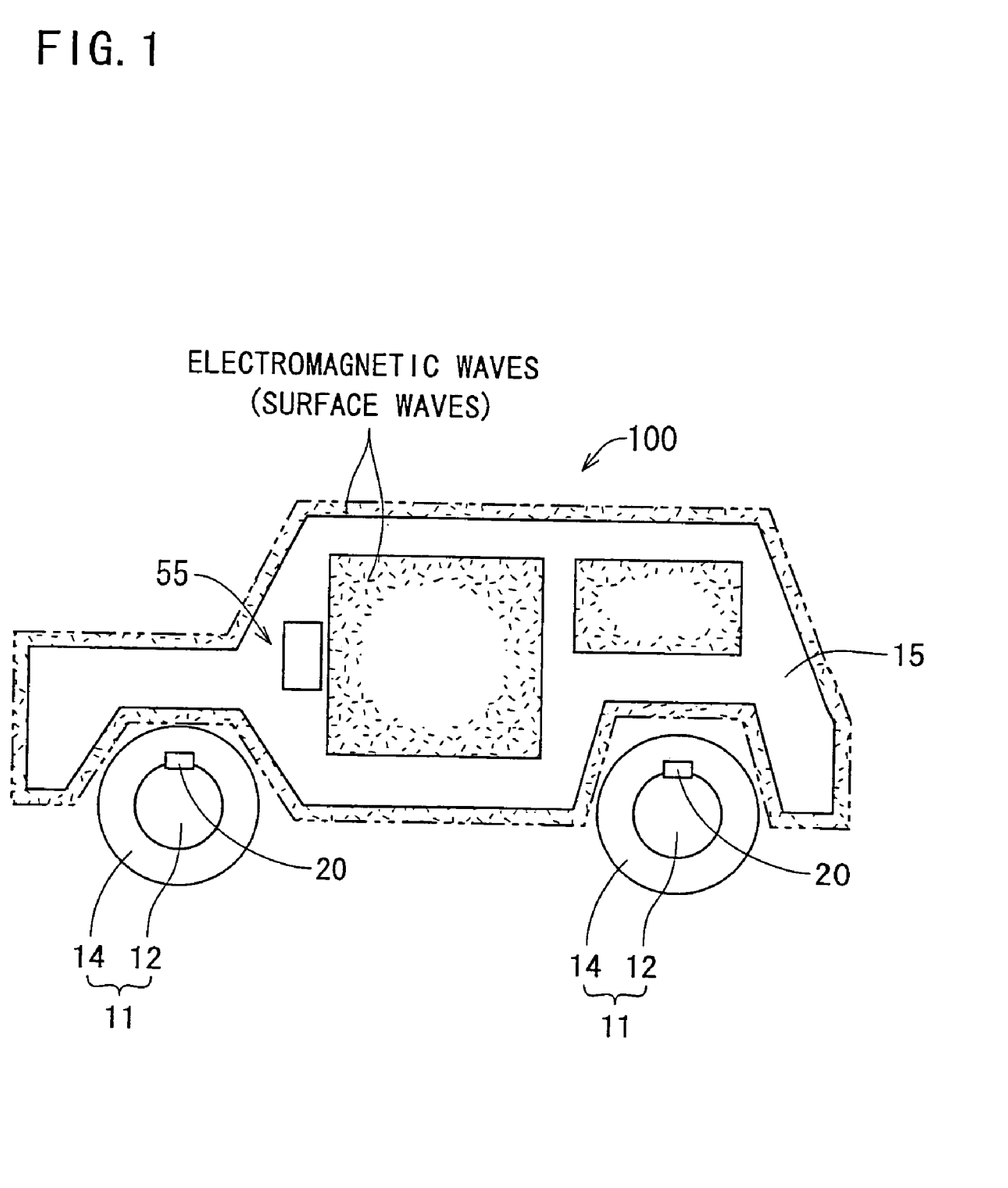
FIG. 1 is a schematic diagram of a vehicle provided with a tire condition monitoring system in accordance with a first embodiment of the present invention.

One embodiment of the present invention will be described with reference to FIGS. 1 to 5. Referring to FIG. 1, a tire condition monitoring system 10 of the embodiment is installed on an automobile 100, for example. The tire condition monitoring system 10 includes four tire side communication devices 20 fixed to four wheel assemblies 11 of the automobile 100 (two of the four wheel assemblies are shown in FIG. 1) and one vehicle-body side communication device 55 mounted on a vehicle body 15 of the automobile 100.

Figure 2:
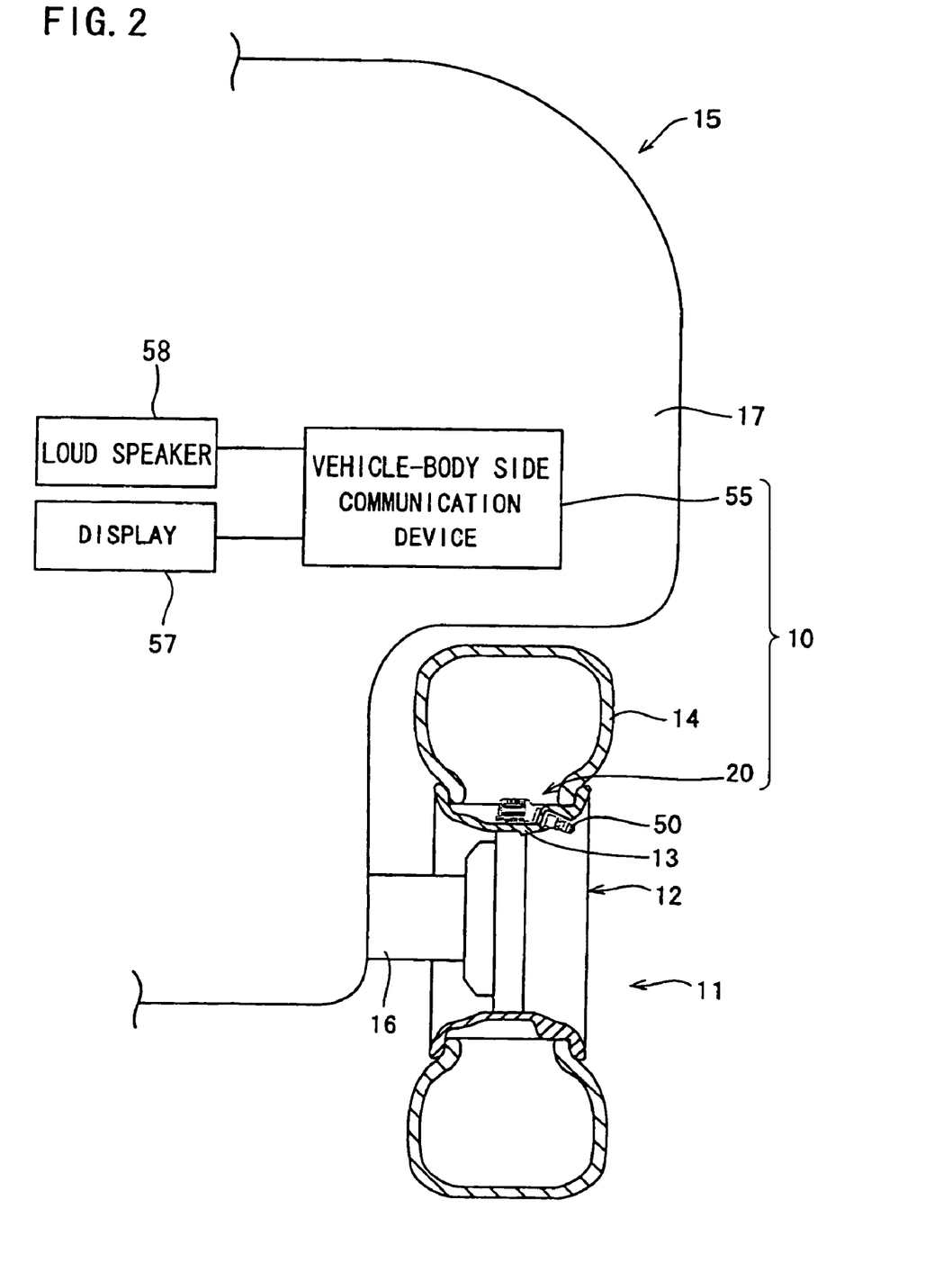
FIG. 2 is also a schematic diagram of the vehicle with the tire condition monitoring system.

Each tire side communication device 20 is provided integrally with a metal tire valve 50 as shown in FIG. 2. Each tire 14 attached to the corresponding wheel assembly 11 has an inner circumferential opening closed by a rim 13 of a tire wheel 12, whereupon an interior of the tire 14 is closed. The tire valve 50 is inserted through and fixed in a through hole (not shown) formed through a widthwise middle portion of the rim 13. The tire valve 50 has a distal end extending from the rim 13 to the opposite side of the vehicle body 15. The tire side communication device 20 includes a resin case 21 formed integrally on a proximal end of the tire valve 50. The case 21 is disposed in the tire 14.

The tire valve 50 includes a cylindrical valve stem 51 provided so that the exterior and interior of the tire 14 communicate with each other. The tire valve 50 includes a core in which a valve core is provided. The valve core prevents compressed air from being discharged through the valve stem 51 and allows compressed air to be charged through the valve stem 51 into the tire 14.

Figure 3:
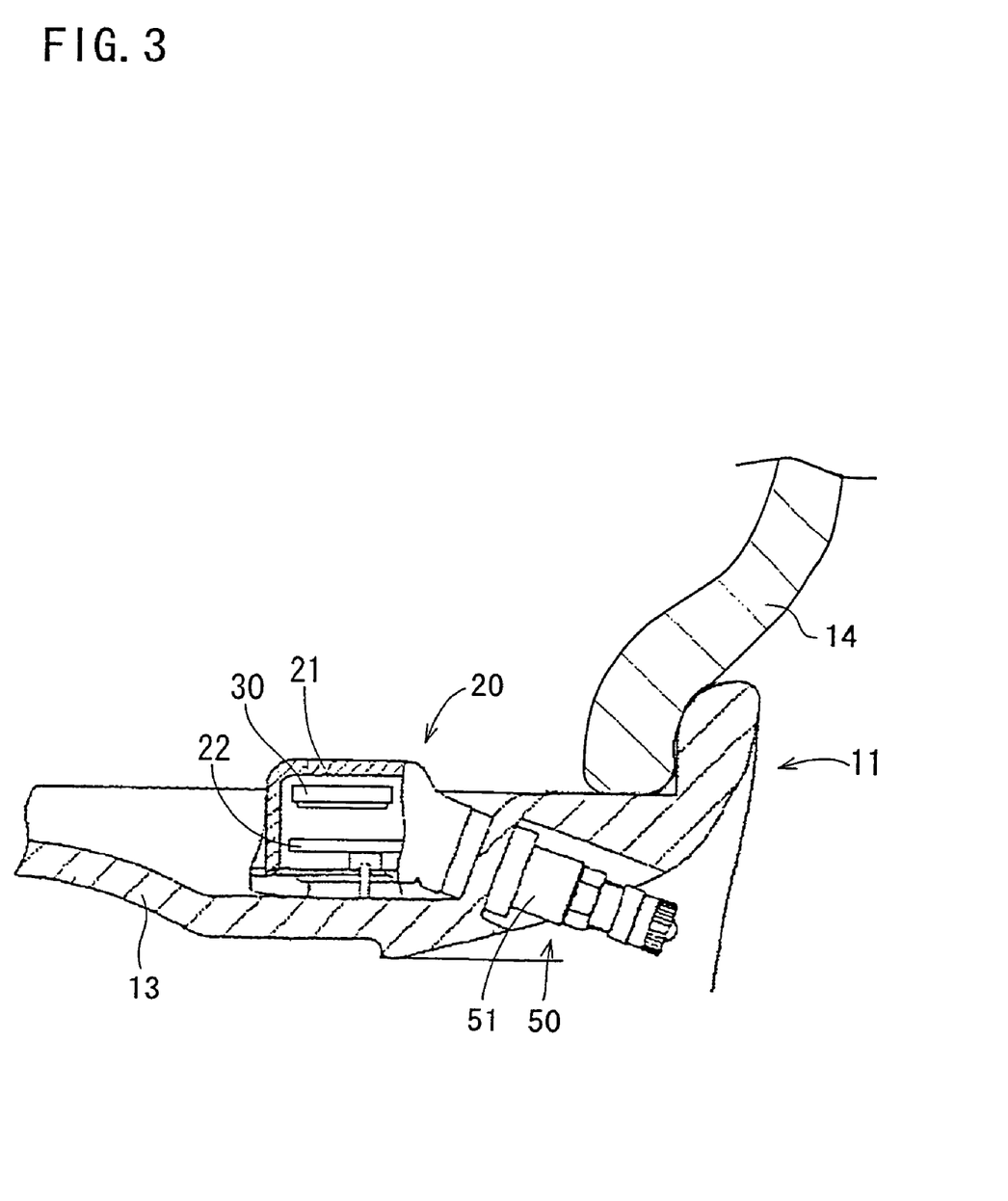
FIG. 3 is a partial section of a tire side communication device.
Figure 4:
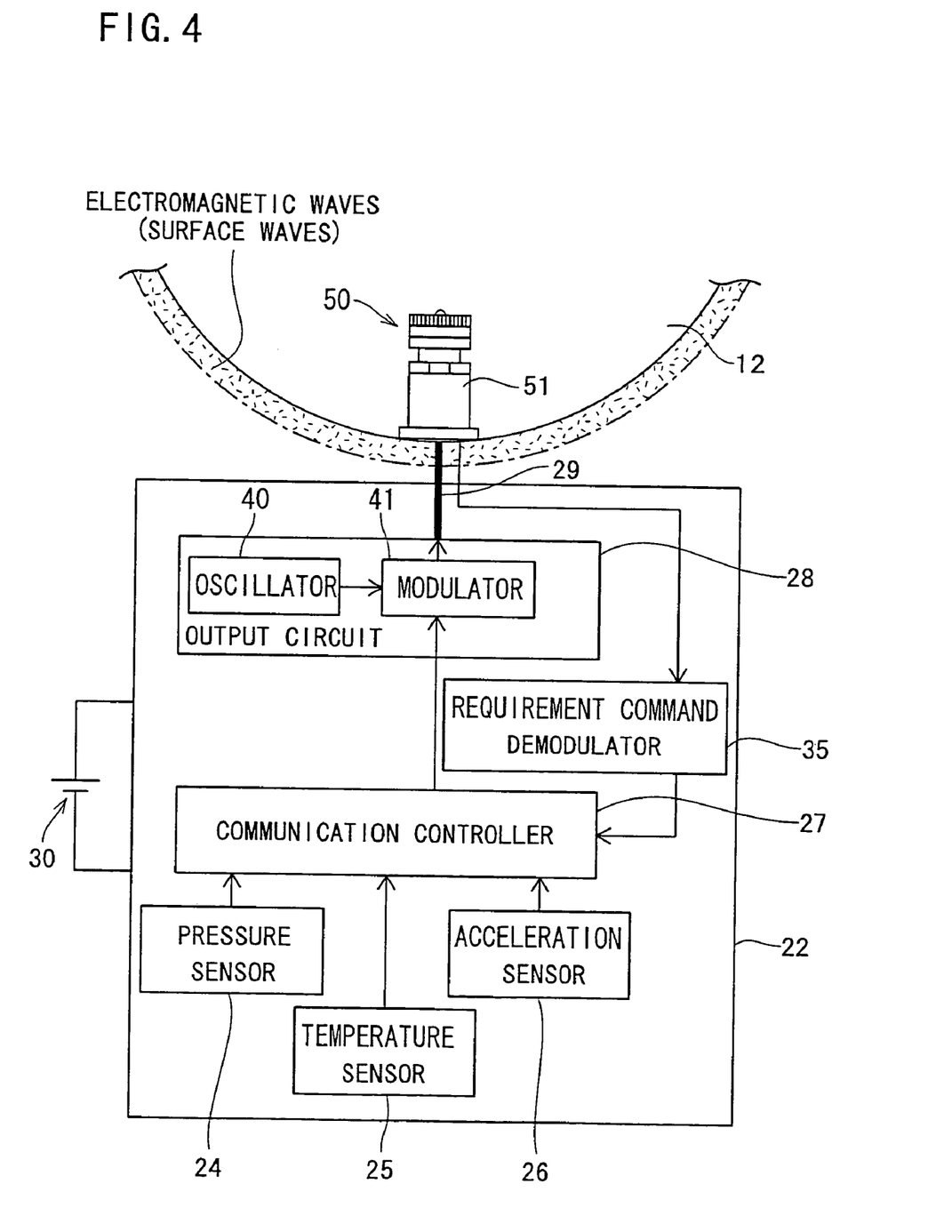
FIG. 4 is a block diagram of the tire side communication device.

Referring to FIG. 3, a circuit board 22 and a microcell 30 are provided in the case 21 of the tire side communication device 20. FIG. 4 shows the circuit board 22 including a communication controller 27 which are connected to a pressure sensor 24, a temperature sensor 25, an acceleration sensor 26, an output circuit 28 and a requirement command demodulator 35. The pressure sensor 24 and temperature sensor 25 detect an internal pressure and temperature in the tire 14 respectively, delivering respective detection information to the communication controller 27. The communication controller 27 includes a read only memory (ROM), a random access memory (RAM) and a central processing unit (CPU), none of which are shown. The ROM stores data of identifiers (IDs) assigned to the tire side communication devices 20 and a predetermined program. The communication controller 27 delivers the detection information from the sensors 24 and 25 and the ID to the output circuit 28.

The output circuit 28 includes an oscillator 40 generating electromagnetic waves serving as carrier waves for the aforesaid detection information and a modulator 41 modulating the electromagnetic waves generated by the oscillator 40, based on the detection information from the communication controller 27 or superimposing the detection information on the electromagnetic waves. The modulator 41 serves as a tire side modulator in the invention.

The modulator 41 is electrically connected to the valve stem 51 by a feeder cable 29, so that electromagnetic waves output by the modulator 41 are adapted to be delivered through the valve stem 51 as surface waves on the metal tire wheel 12. The surface waves propagate to the vehicle body 15 (see FIG. 1). Thus, since the electromagnetic waves are delivered by making use of the valve stem 51 fixed to the tire wheel 12, the production cost can be reduced as compared with the case where dedicated components are provided for transmitting electromagnetic waves to the tire wheel 12. The output circuit 28 may include an amplifying device for amplifying electromagnetic waves output by the modulator 41 and a filter for eliminating noise current from the electromagnetic waves.

The requirement command demodulator 35 is electrically connected to the valve stem 51 and extracts a requirement command from the electromagnetic waves delivered by a vehicle-body side communication device 55, delivering the extracted command to the communication controller 27, as will be described later. The requirement command contains one ID. The communication controller 27 determines whether the received ID corresponds with an ID set therein. When the received ID corresponds with the set ID, the tire side communication device 20 modulates and delivers the electromagnetic waves based on the respective pieces of detection information delivered from the pressure and temperature sensors 24 and 25. On the other hand, when the received ID does not correspond with the set ID, no electromagnetic waves are generated, modulated nor delivered. The requirement command demodulator 35 serves as a tire side demodulator in the invention.

Figure 5:
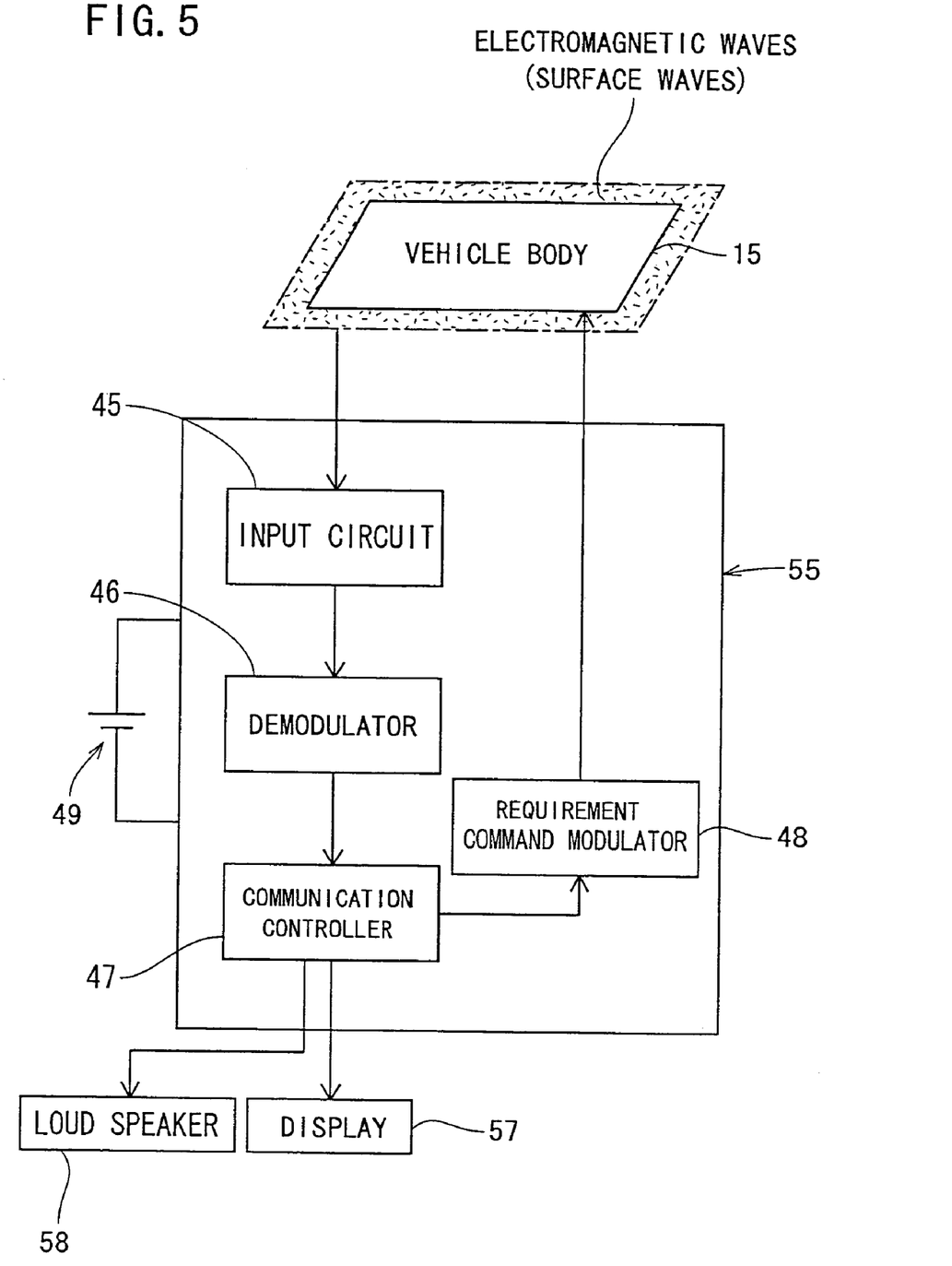
FIG. 5 is a block diagram of a vehicle-body side communication device.

The tire side communication device 20 is arranged as described above. The vehicle-body side communication device 55 is provided on the vehicle body 15 so as to correspond to the tire side communication device 20. The vehicle-body side communication device 55 includes an input circuit 45 for inputting electromagnetic waves delivered by the tire side communication device 20 and propagated as the surface waves through the tire wheel 12 and the vehicle body 15 as shown in FIG. 5. The vehicle-body side communication device 55 further includes a demodulator 46 extracting detection information containing the ID from the input electromagnetic waves and a communication controller 47 executing operational processing based on the extracted detection information. The demodulator 46 serves as a vehicle-body side demodulator in the invention. The vehicle-body side communication device 55 is supplied with electric power from a battery 49 provided on the vehicle, for example, thereby being driven.

The input circuit 45 receives the electromagnetic waves as the surface waves of the vehicle body 15 and carries out a noise suppressing process and an amplifying process for the electromagnetic waves, for example. Furthermore, the communication controller 47 has the same arrangement as the tire side communication device 20 or comprises a ROM, a RAM and a CPU. The ROM stores data of all IDs set in the tire side communication devices 20 respectively. The communication controller 47 (or more specifically, the CPU) determines the condition of the tire 14, based on the detection information extracted from the electromagnetic waves by the demodulator 46, namely, data of the pressure and temperature in the tire 14. The communication controller 47 then controls a display 57 (more specifically, a liquid crystal panel or warning lamp provided on an instrument panel (not shown)) and a loud speaker 58 provided in automobile's interior so that a predetermined informing operation is carried out. In this case, the demodulator 46 of the vehicle-body side communication device 55 may be arranged to amplify the extracted detection information before delivering the information to the communication controller 47. Furthermore, cables (not shown) are used to connect the vehicle-body side communication device 55 to the display 57 and the loud speaker 58.

The communication controller 47 delivers signals to the requirement command modulator 48 (serving as a vehicle-body side modulator in the invention) at predetermined intervals, for example, at intervals of 15 seconds so that a requirement command containing one identifier is delivered. More specifically, the requirement command modulator 48 includes an oscillator (not shown) generating electromagnetic waves serving as carrier waves and generates a requirement command according to the signal from the communication controller 47. The requirement command modulator 48 further modulates the electromagnetic waves based on the requirement command or superimposes the requirement command on the electromagnetic waves. The requirement command modulator 48 then delivers the electromagnetic waves as surface waves of the vehicle body 15. The electromagnetic waves propagate on the vehicle body 15, reaching the tire wheel 12. The electromagnetic waves are then taken via the valve stem 51 into the requirement command demodulator 35 (see FIG. 3) of the tire side communication device 20.

The tire condition monitoring system 10 of the embodiment operates as follows. The tire side communication devices 20 are off while the automobile 100 is stopped. When the automobile 100 is driven to run, the acceleration sensor 26 is subjected to centrifugal force due to revolution of the wheel assembly 11 thereby to be activated. As a result, each tire side communication device 20 starts, thereby being capable of receiving a requirement command from the vehicle-body side communication device 55. The requirement command modulator 48 of the vehicle-body side communication device 55 generates a requirement command containing the identifier of any one of the tire side communication devices 20 of the automobile 100. The requirement command modulator 48 then modulates the electromagnetic waves based on the requirement command, delivering the modulated electromagnetic waves as the surface waves of the vehicle body 15.

The electromagnetic waves delivered to the vehicle body 15 by the vehicle-body side communication device 55 propagate on the surfaces of a plurality of components (the main structure 17, axle 16 and the like) of the vehicle body 15 to be taken into all the tire side communication devices 20. The requirement command demodulator 35 of each tire side communication device 20 extracts the requirement command from the electromagnetic waves. Only one tire side communication device 20 assigned with the same ID as that contained in the requirement command causes the pressure and temperature sensors 24 and 25 to detect the internal pressure and temperature in the tire 14. The tire side communication device 20 modulates the electromagnetic waves based on the detection information, delivering the modulated electromagnetic waves through the valve stem 51 as surface waves of the tire wheel 12. The electromagnetic waves propagate from the tire wheel 12 to the surface of the vehicle body 15 such as, the axle 16, main structure 17 and the like.

The electromagnetic waves are taken into the input circuit 45 of the vehicle-body side communication device 55. The demodulator 46 extracts the detection information from the taken electromagnetic waves. The communication controller 47 executes operational processing based on the extracted detection information. Information about the condition (pressure, temperature or presence or absence of abnormal condition) of the tire 14 is displayed on the display 57 disposed in the automobile interior, and an alarm sound is produced from the loud speaker 58 when the tire 14 is in an abnormal condition.

According to the above-described tire condition monitoring system 10, the tire side communication devices 20 superimpose detection information on the electromagnetic waves, delivering the electromagnetic waves as surface waves of the tire wheel 12 and vehicle body 15. Accordingly, power consumption in output of information can be reduced as compared with the conventional tire condition monitoring systems. Consequently, the microcell used in the tire side communication device 20 can be downsized and the life of the microcell 30 can be longer. More specifically, the tire condition monitoring system 10 of the embodiment consumes −10 dBm (0.1 mW) at the time of information output although a conventional system consumes 3 dBm (2 mW). Thus, the power consumption of the tire condition monitoring system 10 can be reduced to one twentieth of that of the conventional system.

Furthermore, the vehicle-body side communication device 55 is prevented from erroneously receiving information transmitted by a tire side communication device provided on another vehicle. Consequently, the reliability of communication can be improved. Still furthermore, the vehicle-body side communication device 55 also superimposes the requirement command on the electromagnetic waves, delivering the electromagnetic waves as surface waves of the vehicle body 15 and tire wheel 12. Consequently, the life of the battery 49 can be longer.

Tire side communication devices 20 superimpose detection information on electromagnetic waves and deliver the electromagnetic waves on condition that the automobile 100 is in operation or the wheels are in motion. Consequently, the tire condition monitoring system of the embodiment can reduce power consumption as compared with an arrangement that detection information is constantly produced. Furthermore, the tire side communication device 20 superimposing detection information on electromagnetic waves and delivering the electromagnetic waves is only one of the four tire side communication devices 20 assigned with the same IID as that contained in the requirement command. Consequently, the vehicle body 15 can be prevented from receiving electromagnetic waves simultaneously from a plurality of tire side communication devices 20, whereupon the detection information can accurately be transmitted and received.

The present invention should not be limited to the foregoing embodiment. The following embodiments are within the technical scope of the present invention and can be practiced. Furthermore, the invention can be practiced in various modified forms without departing from the gist.

(1) In the foregoing embodiment, the tire side communication devices 20 superimpose detection information of the sensors 24 and 25 on electromagnetic waves and deliver the electromagnetic waves when receiving requirement command from the vehicle-body side communication device 55. However, the tire side communication devices 20 may superimpose detection information containing its own ID on electromagnetic waves asynchronously. As a result, electromagnetic waves are not delivered simultaneously from a plurality of tire side communication devices 20 to the vehicle body 15 and accordingly, the vehicle-body side communication device 55 can accurately receive the detection information from each tire side communication device 20.

Figure 6A:
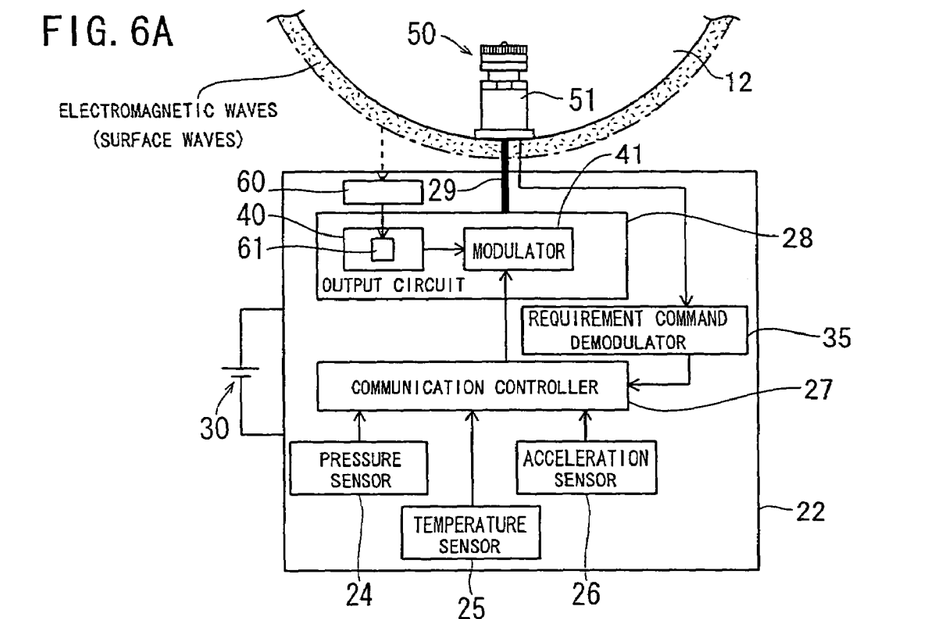
FIGS. 6A and 6B are block diagrams of the tire side communication device and vehicle-body side communication device in accordance with another embodiment of the invention respectively.
Figure 6B:
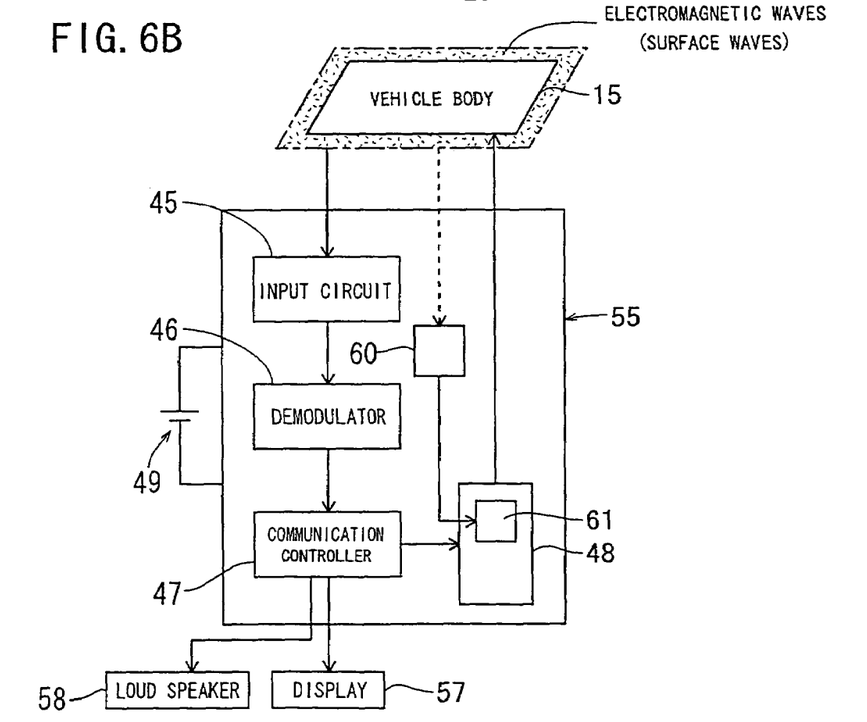

(2) Electric characteristics of the vehicle body 15 are not constant but can change according to the circumstances. For example, an easiness of electricity to flow differs between the conditions where it is dry and wet. The easiness can also vary depending upon the temperature. Accordingly, for example, the intensity of electromagnetic waves delivered by the tire side and vehicle-body side communication devices 20 and 55 is detected by field intensity detectors 60 (serving as electric field intensity detectors in the invention) provided in the respective communication devices 20 and 55, as shown in FIGS. 6A to 6B. Results of detection are fed back to the modulator 41 and requirement command modulator 48 respectively. Based on the detected results, frequencies of electromagnetic waves delivered by the modulators 41 and 48 may be changed by output changing units 61 of the tire side and vehicle-body side communication devices 20 and 55 respectively. Consequently, communication can be stabilized irrespective of a condition of the vehicle body 15.

Each output changing unit 61 may be arranged to select an optimum frequency according to the electric field intensity from among a predetermined frequency range or a plurality of frequencies. The communication devices 55 and 20 are arranged to be capable of receiving electromagnetic waves covering the entire frequencies. Furthermore, when unable to receive electromagnetic waves (detection information) from the tire side communication device 20 the vehicle-body side communication device 55 may change frequencies of electromagnetic waves.

(3) The tire side communication device 20 may be provided with a humidity sensor for detecting humidity in the tire 14.

(4) Although the tire condition monitoring system of the foregoing embodiment is provided with both pressure and temperature sensors 24 and 25, the system may be provided with only the pressure sensor 24.

(5) The power supply to supply electric power to the circuit board 22 need not be limited to the microcell 30. For example, a cylindrical cell, capacitor or the like may be used.

(6) A vehicle on which the tire condition monitoring system is provided need not be limited to the automobile 100. For example, the vehicle may include motorcycles, industrial vehicles such as forklifts or aircrafts.

(7) A revolution sensor for detecting revolution of the wheel assembly 11 may be provided instead of the acceleration sensor 26.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A tire condition monitoring system monitoring a condition of a tire attached to a tire wheel, comprising:
    a tire side communication device mounted on the tire wheel for detecting an inner pressure of the tire and transmitting a result of detection by electromagnetic waves;
    a vehicle-body side communication device provided on a vehicle body including a plurality of components for receiving the electromagnetic waves transmitted by the tire side communication device;
    a tire side modulator provided in the tire side communication device for superimposing information including the result of detection on electromagnetic waves, thereby outputting the electromagnetic waves as surface waves propagating on a surface of the tire wheel; and
    a vehicle-body side demodulator provided in the vehicle-body side communication device for receiving the propagated electromagnetic waves that are further propagated from the tire wheel to surfaces of the plurality of components of the vehicle body.

2. The tire condition monitoring system according to claim 1, further comprising:
    a tire valve provided integrally on the tire side communication device so as to be capable of charging a gas into the tire; and
    a valve stem provided on the tire valve and propagating the electromagnetic waves outputted to the tire wheel by the tire side modulator.

3. The tire condition monitoring system according to claim 2, further comprising:
    a vehicle-body side modulator provided in the vehicle-body side communication device for superimposing information to be transmitted to the tire side communication device, thereby outputting the electromagnetic waves as the surface waves of the components of the vehicle body; and
    a tire side demodulator provided in the tire side communication device for receiving the electromagnetic waves propagated from the surfaces of the components of the vehicle body to the surface of the tire wheel.

4. The tire condition monitoring system according to claim 3, further comprising:
    electric field intensity detectors provided on the vehicle-body side and tire side communication devices for detecting intensity of the electromagnetic waves outputted by the vehicle-body side and tire side modulators respectively; and
    output changing units changing frequencies of the electromagnetic waves outputted by the vehicle-body side and tire side modulators respectively, based on the results of detection by the electric field intensity detectors.

5. The tire condition monitoring system according to claim 4, wherein the vehicle includes a plurality of the tire wheels, a plurality of the tire side communication devices are attached to the tire wheels respectively, and the information superimposed on the electromagnetic waves by the tire side modulators includes an identifier to identify the tire.

6. The tire condition monitoring system according to claim 5, wherein the vehicle includes a plurality of the tire wheels, a plurality of the tire side communication devices are attached to the tire wheels respectively, and the tire side communication devices of the tire wheels superimpose the information on the electromagnetic waves and output the electromagnetic waves asynchronously among the tire side communication devices.

7. The tire condition monitoring system according to claim 4, wherein the vehicle includes a plurality of the tire wheels, a plurality of the tire side communication devices are attached to the tire wheels respectively, and the tire side communication devices of the tire wheels superimpose the information on the electromagnetic waves and output the electromagnetic waves asynchronously among the tire side communication devices.

8. The tire condition monitoring system according to claim 3, wherein the vehicle includes a plurality of the tire wheels, a plurality of the tire side communication devices are attached to the tire wheels respectively, and the information superimposed on the electromagnetic waves by the tire side modulators includes an identifier to identify the tire.

9. The tire condition monitoring system according to claim 8, wherein the vehicle includes a plurality of the tire wheels, a plurality of the tire side communication devices are attached to the tire wheels respectively, and the tire side communication devices of the tire wheels superimpose the information on the electromagnetic waves and output the electromagnetic waves asynchronously among the tire side communication devices.

10. The tire condition monitoring system according to claim 3, wherein the vehicle includes a plurality of the tire wheels, a plurality of the tire side communication devices are attached to the tire wheels respectively, and the tire side communication devices of the tire wheels superimpose the information on the electromagnetic waves and output the electromagnetic waves asynchronously among the tire side communication devices.

11. The tire condition monitoring system according to claim 2, wherein the vehicle includes a plurality of the tire wheels, a plurality of the tire side communication devices are attached to the tire wheels respectively, and the information superimposed on the electromagnetic waves by the tire side modulators includes an identifier to identify the tire.

12. The tire condition monitoring system according to claim 11, wherein the vehicle includes a plurality of the tire wheels, a plurality of the tire side communication devices are attached to the tire wheels respectively, and the tire side communication devices of the tire wheels superimpose the information on the electromagnetic waves and output the electromagnetic waves asynchronously among the tire side communication devices.

13. The tire condition monitoring system according to claim 2, wherein the vehicle includes a plurality of the tire wheels, a plurality of the tire side communication devices are attached to the tire wheels respectively, and the tire side communication devices of the tire wheels superimpose the information on the electromagnetic waves and output the electromagnetic waves asynchronously among the tire side communication devices.

14. The tire condition monitoring system according to claim 1, further comprising:
   a vehicle-body side modulator provided in the vehicle-body side communication device for superimposing information to be transmitted to the tire side communication device, thereby outputting the electromagnetic waves as the surface waves of the components of the vehicle body; and
   a tire side demodulator provided in the tire side communication device for receiving the electromagnetic waves propagated from the surfaces of the components of the vehicle body to the surface of the tire wheel.

15. The tire condition monitoring system according to claim 14, further comprising:
   electric field intensity detectors provided on the vehicle-body side and tire side communication devices for detecting intensity of the electromagnetic waves outputted by the vehicle-body side and tire side modulators respectively; and
   output changing units changing frequencies of the electromagnetic waves outputted by the vehicle-body side and tire side modulators respectively, based on the results of detection by the electric field intensity detectors.

16. The tire condition monitoring system according to claim 15, wherein the vehicle includes a plurality of the tire wheels, a plurality of the tire side communication devices are attached to the tire wheels respectively, and the information superimposed on the electromagnetic waves by the tire side modulators includes an identifier to identify the tire.

17. The tire condition monitoring system according to claim 16, wherein the vehicle includes a plurality of the tire wheels, a plurality of the tire side communication devices are attached to the tire wheels respectively, and the tire side communication devices of the tire wheels superimpose the information on the electromagnetic waves and output the electromagnetic waves asynchronously among the tire side communication devices.

18. The tire condition monitoring system according to claim 15, wherein the vehicle includes a plurality of the tire wheels, a plurality of the tire side communication devices are attached to the tire wheels respectively, and the tire side communication devices of the tire wheels superimpose the information on the electromagnetic waves and output the electromagnetic waves asynchronously among the tire side communication devices.

19. The tire condition monitoring system according to claim 14, wherein the vehicle includes a plurality of the tire wheels, a plurality of the tire side communication devices are attached to the tire wheels respectively, and the information superimposed on the electromagnetic waves by the tire side modulators includes an identifier to identify the tire.

20. The tire condition monitoring system according to claim 19, wherein the vehicle includes a plurality of the tire wheels, a plurality of the tire side communication devices are attached to the tire wheels respectively, and the tire side communication devices of the tire wheels superimpose the information on the electromagnetic waves and output the electromagnetic waves asynchronously among the tire side communication devices.

21. The tire condition monitoring system according to claim 14, wherein the vehicle includes a plurality of the tire wheels, a plurality of the tire side communication devices are attached to the tire wheels respectively, and the tire side communication devices of the tire wheels superimpose the information on the electromagnetic waves and output the electromagnetic waves asynchronously among the tire side communication devices.

22. The tire condition monitoring system according to claim 1, wherein the vehicle includes a plurality of the tire wheels, a plurality of the tire side communication devices are attached to the tire wheels respectively, and the information superimposed on the electromagnetic waves by the tire side modulators includes an identifier to identify the tire.

23. The tire condition monitoring system according to claim 22, wherein the vehicle includes a plurality of the tire wheels, a plurality of the tire side communication devices are attached to the tire wheels respectively, and the tire side communication devices of the tire wheels superimpose the information on the electromagnetic waves and output the electromagnetic waves asynchronously among the tire side communication devices.

24. The tire condition monitoring system according to claim 1, wherein the vehicle includes a plurality of the tire wheels, a plurality of the tire side communication devices are attached to the tire wheels respectively, and the tire side communication devices of the tire wheels superimpose the information on the electromagnetic waves and output the electromagnetic waves asynchronously among the tire side communication devices.

* * * * *